United States Patent

Williams et al.

[11] Patent Number: 6,045,726
[45] Date of Patent: Apr. 4, 2000

[54] FIRE SUPPRESSANT

[75] Inventors: Edna M. Williams, Chester Gap; Brian K. Wheatley, Marshall; Jamie B. Neidert, Jeffersonton; Robert D. Lynch, Warrengton; James D. Martin, Manassas, all of Va.

[73] Assignee: Atlantic Research Corporation, Gainesville, Va.

[21] Appl. No.: 09/109,156

[22] Filed: Jul. 2, 1998

[51] Int. Cl.[7] .............................. C09K 21/00; C08K 5/29
[52] U.S. Cl. ................. 252/602; 149/19.1; 149/19.91; 149/20; 149/47; 149/62; 149/88; 106/18.21; 252/607; 252/608; 252/609; 428/921; 524/195; 524/503; 524/429; 524/714
[58] Field of Search .................. 252/602, 607, 252/608, 609; 428/921; 106/18.21; 524/503, 429, 714, 195; 149/19.1, 19.91, 20, 47, 62, 88

[56] References Cited

U.S. PATENT DOCUMENTS

| | | | |
|---|---|---|---|
| 868,837 | 10/1907 | Braunstein et al. | 52/5 |
| 2,710,793 | 6/1955 | Hutchison | 52/0.5 |
| 2,912,394 | 11/1959 | Stilbert et al. | 524/195 |
| 2,968,542 | 1/1961 | Brock | 52/24 |
| 3,044,123 | 7/1962 | Grubaugh | 18/55 |
| 3,641,935 | 2/1972 | Gawlick et al. | 102/39 |
| 3,682,727 | 8/1972 | Heinzelmann et al. | 149/19 |
| 3,954,528 | 5/1976 | Chang et al. | 149/19.4 |
| 3,972,820 | 8/1976 | Filter et al. | 252/5 |
| 4,185,008 | 1/1980 | Caspari et al. | 524/429 |
| 4,336,323 | 6/1982 | Winslow | 524/89 |
| 4,366,010 | 12/1982 | Sedat | 149/19.6 |
| 4,367,103 | 1/1983 | Enever | 149/7 |
| 4,455,178 | 6/1984 | Sedat | 149/19.6 |
| 4,875,948 | 10/1989 | Verneker | 149/15 |
| 5,051,110 | 9/1991 | Borrell et al. | 252/608 |
| 5,507,891 | 4/1996 | Zeigler | 149/19.9 |
| 5,545,272 | 8/1996 | Poole et al. | 149/48 |
| 5,641,938 | 6/1997 | Holland et al. | 149/48 |
| 5,747,730 | 5/1998 | Scheffe et al. | 149/19.91 |
| 5,783,773 | 7/1998 | Poole | 149/47 |
| 5,872,329 | 11/1996 | Burns et al. | 149/36 |

*Primary Examiner*—Veronica P. Hoke
*Attorney, Agent, or Firm*—Nixon & Vanderhye P.C.

[57] ABSTRACT

A fire suppressant composition is provided which exhibits a low pressure and low flame temperature. The composition comprises ammonium nitrate and a guanidine salt or derivative which produces greater than 3 moles of inert gas per 100 grams of composition and alkali metal or alkaline earth salts for flame suppression. The composition may also include iron or iron oxide.

7 Claims, No Drawings

FIRE SUPPRESSANT

TECHNICAL FIELD

The present invention relates to fire suppressant compositions and is particularly useful in suppressing fires in enclosed areas.

BACKGROUND ART

The most effective conventional gaseous fire extinguishing systems available comprise the HALON class of flame retardants and fire extinguishers, which enjoy wide usage and acceptance within the civilian and military communities. For example, HALON 104 containing carbon tetrachloride ($CCl_4$) is conventionally used to fight electrical fires. The most effective and widely used fire extinguishing agents contained bromine compounds which thermally decompose in a fire or flame to produce the bromide anion ($Br^-$) which disrupts the chain reactions involved in the burning process.

However, HALONS are environmentally unacceptable and are believed to cause depletion of the stratospheric ozone layer. Accordingly, the manufacture of HALONS was banned on Dec. 31, 1994 and the manufacture of chlorofluorocarbons (CFCs) was banned on Dec. 31, 1995.

There is, therefore, an urgent need for effective alternate fire extinguishing systems that do not involve HALONS.

DISCLOSURE OF THE INVENTION

An object of the present invention is an effective fire suppressant composition which does not comprise any HALON.

According to the present invention, the foregoing and other objects are achieved in part by a fire suppressant composition comprising: ammonium nitrate and a guanidine derivative, which composition produces greater than 3 moles of inert gas per 100 grams of the composition.

Another aspect of the present invention is a fire suppressant composition comprising: ammonium nitrate and a guanidine salt or derivative, wherein the oxygen to fuel ratio is about 1.00. At this ratio, the generation of oxygen gas is reduced to avoid the contribution to and promotion of burning.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the present claims.

BEST MODE FOR CARRYING OUT THE INVENTION

The present invention relates to a gas generating composition for generating a gas with fire suppressant activity. Advantageously, the inventive fire suppressant composition generates large quantities of inert gases in which alkali metal or alkaline earth hydroxides and carbonate salts are entrained. Embodiments of the present invention include the generation of combustion gases with entrained iron or in which combustion species of iron are entrained. The effectiveness of the present invention stems from the chemical fire suppression activity of alkali metal or alkaline earth hydroxides and carbonates, as well as iron species, in combination with the dilution effect of the large volume of generated inert gases which reduce the amount of available oxygen. The gas generant may be in the form of pressed charges, granules, extruded solids and hollow rods.

The fire suppressant composition according to the present invention comprises a propellant which is selected to optimize both the burning or deflagration rate and chemical decomposition products. The composition can be in the form of a solid solution.

In accordance with the present invention, the ratio of the oxidizer to the fuel is desirably optimized so that the fuel component is minimized vis-à-vis conventional practices in formulating gas-generating compositions for airbag utility, in order to avoid the undesirable consequence of propelling a fuel into a fire. The optimization of the ratio of oxidizer to fuel to about 1:1 would generate some $NO_x$ residues which, while unacceptable in the environment of an automotive airbag, are acceptable for fire suppressant activity.

An alkali metal or alkaline earth salt is included, such as a potassium nitrate. The alkali metal or alkaline earth salt, during combustion, generates a high volume of alkali metal or alkaline earth hydroxides and carbonates which exhibit chemical flame fire suppressant activity. Desirably, the amount of alkali metal or alkaline earth salt is optimized so that the resulting fire suppressant composition is capable of generating greater than 3 moles of gas per 100 grams of composition. The fire suppressant composition in accordance with the present invention desirably exhibits a low pressure exponent of less than about 0.6, a high burning rate and a low flame temperature. Accordingly, the fire suppressant compositions of the present invention are particularly suitable to suppress fires in enclosed areas by chemical action and, simultaneously, diluting available oxygen.

In accordance with one embodiment of the present invention, iron or an iron oxide, e.g. $Fe_2O_3$, is strategically incorporated to enhance interruption in flaming-combustion chain reactions. The iron or metal oxide may be present in an amount of from about 0.5% to about 10%, such as about 0.5% to about 5%, e.g. about 5%. All percentages (%) throughout the specification mean percent by weight unless otherwise indicated.

Ammonium nitrate (AN) is a commonly used oxidizer since it gives high gas yield per unit weight and yields a non-toxic and non-corrosive exhaust at low flame temperatures. AN may be present in the range of from about 40% to about 70%, such as about 43% to about 61%, e.g. about 43%.

Guanidine salts or derivatives suitable for use in the present invention include, for example, aminoguanidine nitrate (AGN), guanidine nitrate (GN), triaminoguanidine nitrate (TAGN), diaminoguanidine nitrate (DAGN), ethylenebis-(aminoguanidinium) dinitrate and monoaminoguanidine nitrate (MAGN). The guanidine salt or derivative may be present in the range of from about 20% to about 40%, such as about 26% to about 36%, e.g. about 36%.

The compositions of the present invention comprise one or more alkali metal or alkaline earth (Group I and/or II) salts, e.g., carbonates and/or nitrates. Preferred nitrate is salts of an alkali metal are potassium nitrate (KN), sodium nitrate and/or cesium nitrate. The nitrate salt of an alkali metal may be present in the range of from about 5% to about 30%, such as from about 15% to about 25%, for example, about 18%. Reaction products from the combustion of Group I and II metal compounds were found to suppress flame and combustion.

The compositions of the present invention may also further comprise a minor amount of a water-soluble organic binder. The water-soluble organic binder may comprise cellulosics, such as cellulose acetate (CA), polyvinyl alcohol (PVA), hydroxyterminated polybutadiene (HTPB), polyesters and/or epoxies. The water-soluble organic binder may be present in the range of from about 1% to about 5%, such as about 3% to about 4%, e.g. about 3%.

Additives conventionally employed in gas generating compositions can also be incorporated, provided they are not inconsistent with the objectives of the present invention. Non-energetic flame retardant chemicals also can be used to supplement the formulations of the present invention. In addition, flame inhibition chemicals, such as sodium bicarbonate, potassium bicarbonate, potassium carbonate, potassium chloride, and monoammonium phosphate and iodide and bromide compounds can be employed as additives to the compositions of the present invention.

When it is indicated that a fire is present or imminent in, for example, a cargo bay of an airplane or ship, or in vehicles or buildings, the compositions of the present invention may be actuated to produce and release a mixture of water vapor and inert gases in which salts of the alkali metals and/or combustion species of the iron and/or iron oxide are entrained. The fire is effectively suppressed by chemical action of the generated salts and by action of generated inert gases in reducing the oxygen content to a level that will not sustain combustion. The compositions employed in the present invention have low pressure exponents, high burning rates and low flame temperatures. The reaction times to produce the water vapor and inert gaseous products, are typically in milliseconds, thereby providing rapid and efficient fire suppression.

EXAMPLES

Tables 1 and 2 exemplify gas generant compositions according to the present invention, volume of generated inert gases, amount of solids which chemically suppress fire and the burning rate.

TABLE 1

Composition Range of Ingredients

| Ingredient: | Wt. % Range |
| --- | --- |
| AN | 40–70 |
| GN | 20–40 |
| Alkali metal (i.e., KN) | 5–30 |
| PVA | 1–5 |
| iron | 1–10 |

TABLE 2

Gas Generant Examples

| Formulation Variable: | Example 1 | Example 2 | Example 3 | Example 4 |
| --- | --- | --- | --- | --- |
| Composition: | | | | |
| AN, % | 43 | 61 | 47 | 61 |
| GN, % | 36 | 31 | 32 | 26 |
| KN, % | 18 | 5 | — | 5 |
| CsN, % | — | — | 18 | — |
| PVA, % | 3 | 3 | 3 | 3 |
| iron, % | — | — | — | 5 |
| Thermochemical: Thompson, Mann, and Cordtz: | | | | |
| $T_e$, °K. | 1144 | 1058 | 993 | 1130 |
| Gas, moles | 3.9 | 4.2 | 3.7 | 3.9 |
| solids, % | 12.2 | 3.4 | 15 | 9.5 |

TABLE 2-continued

Gas Generant Examples

| Formulation Variable: | Example 1 | Example 2 | Example 3 | Example 4 |
| --- | --- | --- | --- | --- |
| Burning Rate, ips @P, psi | | | | |
| 1000 | .18 | .2 | .27 | .17 |
| 2000 | .47 | .43 | .49 | .35 |
| 4000 | .58 | .71 | .72 | .60 |
| exponent above 2K | .3 | .72 | .5 | .60 |

In the previous description, numerous specific details are set forth, such as specific structures, chemicals, processes, etc., to provide a thorough understanding of the present invention. However, as one having ordinary skill in the art would recognize, the present invention can be practiced without resorting to the details specifically set forth. In other instances, well know processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. A combustible fire suppressant composition, which composition comprises an effective fire-suppressant mixture of:
   an ammonium nitrate oxidizer;
   a fuel selected from guanidine salts which is present in an amount to achieve a balanced ratio of oxygen to fuel of substantially 1:1;
   a nitrate or carbonate salt of an alkali metal or alkaline earth;
   a water-soluble organic binder; and
   iron or an iron oxide; wherein
      said composition produces greater than 3 moles of inert gas per 100 grams of said composition when combusted which entrains fire-suppressing amounts of combustion products of alkali metal or alkaline earth hydroxides and carbonate salts along with iron or combustion species of iron.

2. The composition of claim 1, wherein the oxidizer is present in an amount of about 40 wt. % to about 70 wt. %.

3. The composition of claim 1 or 2, wherein the fuel is present in an amount about 20 wt. % to about 40 wt. %.

4. The composition of claim 3, wherein the alkali metal or alkaline earth salt is present in an amount between about 5 wt. % to about 30 wt. %.

5. The composition of claim 1, wherein the fuel is at least one selected from the group consisting of aminoguanidine nitrate, guanidine nitrate, triaminoguanidine nitrate, diaminoguanidine nitrate, ethylenebis-(aminoguanidinium) dinitrate and monoaminoguanidine nitrate.

6. The composition of claim 1 or 5, wherein the nitrate or carbonate salt of an alkali metal or alkaline earth is at least one selected from the group consisting of potassium nitrate, sodium nitrate and cesium nitrate.

7. A method for suppressing a fire which comprises combusting near the fire a combustible fire-suppressing composition as in claim 1.

* * * * *

UNITED STATES PATENT AND TRADEMARK OFFICE

CERTIFICATE OF CORRECTION

PATENT NO. : 6,045,726
DATED : April 4, 2000
INVENTOR(S) : Edna M. WILLIAMS et al It is certified that error appears in the above-identified patent and that said letters patent is hereby corrected as shown below:

On title page, item [75], after Robert D. Lynch, change "Warrengton" to --Warrenton--, Column 1, line 36, before "derivative", insert --salt--, Column 2, line 7, at end of sentence after "...solid solution.", insert --mixture--, Column 2, line 18, before "potassium nitrate.", remove "a", Column 2, line 57, remove "nitrate is", Column 2, line 66, after "water-soluble", insert --or--, Column 3, line 3, after "water-soluble", insert --or--, Column 4, line 21, change "well know" to --well-known--.

Signed and Sealed this

Eighth Day of May, 2001

*Attest:*

NICHOLAS P. GODICI

*Attesting Officer*  *Acting Director of the United States Patent and Trademark Office*